United States Patent
Kikuchi

(10) Patent No.: US 7,482,545 B2
(45) Date of Patent: Jan. 27, 2009

(54) IN-VEHICLE KNOB SWITCH

(75) Inventor: Tsuyoshi Kikuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/027,392

(22) Filed: Feb. 7, 2008

(65) Prior Publication Data

US 2008/0185278 A1  Aug. 7, 2008

(30) Foreign Application Priority Data

Feb. 7, 2007  (JP)  ............................. 2007-028281

(51) Int. Cl.
  *H01H 9/00* (2006.01)
(52) U.S. Cl. ............... 200/61.54; 200/61.28; 200/332.2
(58) Field of Classification Search ............. 200/61.27, 200/61.28, 61.39, 61.54, 335, 336, 332.2
  See application file for complete search history.

(56) References Cited

U.S. PATENT DOCUMENTS

| | | | |
|---|---|---|---|
| 5,804,784 A * | 9/1998 | Uchiyama et al. | 200/61.54 |
| 5,905,237 A | 5/1999 | Hayakawa et al. | |
| 6,091,033 A * | 7/2000 | Kato | 200/61.54 |
| 6,617,534 B2 * | 9/2003 | Goff et al. | 200/61.54 |
| 6,624,366 B2 * | 9/2003 | Uchiyama et al. | 200/61.54 |

* cited by examiner

*Primary Examiner*—Kyung Lee
(74) *Attorney, Agent, or Firm*—Brinks Hofer Gilson & Lione

(57) ABSTRACT

An in-vehicle knob switch comprises a tubular housing that has an opening disposed in a portion of an outer circumferential surface thereof, a holder that is disposed inside the housing, a circuit board that is fixed to the holder, and a push switch that is mounted on one surface of the circuit board that faces the holder. The in-vehicle knob switch also comprises a slide operating type electric part that is mounted on the other surface of the circuit board, an operating key that pushes the push switch, and a rotating body that has a tubular driving portion that can operate the slide operating type electric part. The operating key is exposed to the outside of the housing through the opening. The rotating body includes an operating ring portion that is rotatable and exposed from the outer circumferential surface of the housing. A spiral hole engaged with a slider of the slide operating type electric part is disposed in a portion of a circumferential wall of the tubular driving portion. A cutout portion into which the operating key is loosely inserted is provided in another portion of the circumferential wall that is substantially opposite to the spiral hole. The cutout portion is disposed such that the tubular driving portion substantially does not interfere with the operating key within the rotation range of the rotating body.

9 Claims, 3 Drawing Sheets

IN-VEHICLE KNOB SWITCH

This application claims priority to the Japanese Patent Application No. 2007-028281, filed Feb. 7, 2007, the entire content of which is hereby incorporated by reference.

FIELD

The prevent disclosure relates to an in-vehicle knob switch, which is called a stalk switch, including a tubular housing that can be tilted, and more particularly, to an in-vehicle knob switch having an operating key for a push operation and an operating ring portion for a rotating operation formed in an outer circumferential surface of a housing.

BACKGROUND

In general, in-vehicle knob switches, which are called stalk switches, are provided in the vicinity of a steering column of a vehicle in order to control the operation of a wiper or a headlight. The in-vehicle knob switch includes a tubular housing that is tiltably supported by the steering column, a circuit board that is fixed to a holder in the housing, a rotating body that includes an operating ring portion and is rotatably mounted to an outer circumferential surface of the housing, and an operating key that is exposed from the outer circumferential surface of the housing. The circuit board has electric parts, such as a push switch that is operated by the push of the operating key and a rotary volume that is operated by the rotation of the operating ring portion, mounted thereon. A user tilts the housing, pushes the operating key provided on the outer circumferential surface of the housing, or rotates the operating ring portion to turn on or off the wiper, control the speed and intermittent operation of the wiper, or turn on or off the headlight or control the beam direction of the headlight.

An in-vehicle knob switch having the following structure has been proposed: a push switch is mounted on one surface of a circuit board, and a rotary volume (a rotation detecting electric part) is mounted on the other surface of the circuit board; an operating key is disposed at a position facing a stem of the push switch; and two kinds of gears are provided to transmit the rotation of an operating ring portion to the rotary volume (for example, refer to U.S. Pat. No. 5,905,237, which corresponds to JP-A-10-269898). The axes of the two kinds of gears are orthogonal to each other. A first gear is integrally formed with the operating ring portion, and a shaft of a second gear engaged with the first gear is splined to a rotating shaft of the rotary volume. In this way, when the user rotates the operating ring portion, the rotating shaft of the rotary volume is rotated through the first and second gears, and a signal corresponding to the rotation of the ring portion is output from the rotary volume. When the user pushes the operating key, the stem of the push switch is pushed, and on/off signals corresponding to the push of the operating key are output from the push switch.

However, in this kind of in-vehicle knob switch, as in the related art, when the rotation of the operating ring portion is transmitted to the rotation detecting electric part through the two gears, the structure of the rotation transmitting mechanism becomes complicated, which makes it difficult to manufacture the rotation transmitting mechanism at a low cost.

Therefore, the inventors have proposed a rotation transmitting mechanism in which, in order to omit the two kinds of gears, a tubular driving portion having a spiral hole formed in a circumferential wall thereof is integrally formed with an operating ring portion, and a slider engaged with the spiral hole reciprocates in a straight line along a circuit board with the forward or backward rotation of the operating ring portion. That is, a slide operating type electric part having a slider that can reciprocate in a straight line is used as the rotation detecting electric part, and the slider is engaged with the spiral hole of the tubular driving portion that is integrally rotated with the operating ring portion. The rotary power of the tubular driving portion is converted into the rectilinear motion of the slider by the engaging portion. According to this structure, it is not necessary to provide the two kinds of gears between the operating ring portion and the rotation detecting electric part. As a result, it is possible to reduce manufacturing costs.

In the in-vehicle knob switch having the rotation transmitting mechanism in which the slider of the rotation detecting electric part is directly driven by the tubular driving portion integrally formed with the operating ring portion, it is necessary to provide the tubular driving portion so as not to hinder the up and down movement of the operating key that is opposite to the push switch. It is easy to arrange the tubular driving portion between the operating ring portion and the operating key in the housing. However, when a space for the arrangement of the tubular driving portion is ensured between the operating ring portion and the operating key, a large positional deviation between the operating ring portion and the operating key occurs in the longitudinal direction of the circuit board. In this case, when the user continuously operates the operating ring portion and the operating key, the movement of fingers increases, which results in low operability. In addition, when a space for the arrangement of the tubular driving portion is ensured between the operating ring portion and the operating key, a region in which the rotation detecting electric part is mounted and a region in which the push switch is mounted on both surfaces of the circuit board deviate from each other in the longitudinal direction of the circuit board. As a result, the size of the circuit board increases, which makes it difficult to reduce the size of the housing. That is, the size or diameter of the tubular housing should be reduced due to the restrictions of the design. However, when there are difficulties in reducing the size of the circuit board in the housing due to the mounting space, it is difficult to reduce the size of the housing. The related art has not solved these problems.

SUMMARY

The present disclosure is designed to solve the above-mentioned problems, and an object of the present disclosure is to provide an in-vehicle knob switch having high operability and a small size.

According to an aspect of the present disclosure, an in-vehicle knob switch includes: a tubular housing that has an opening disposed in a portion of an outer circumferential surface thereof; a holder that is disposed inside the housing; a circuit board that is fixed to the holder; a push switch that is mounted on one surface of the circuit board that faces the holder; a slide operating type electric part that is mounted on the other surface of the circuit board; an operating key that pushes the push switch; and a rotating body that has a tubular driving portion that can operate the slide operating type electric part. The operating key is exposed to the outside of the housing through the opening. The rotating body includes an operating ring portion that is rotatable and exposed from the outer circumferential surface of the housing. A spiral hole engaged with a slider of the slide operating type electric part is disposed in a portion of a circumferential wall of the tubular driving portion. A cutout portion into which the operating key is loosely inserted is provided in another portion of the circumferential wall that is substantially opposite to the spiral hole. The cutout portion is disposed such that the tubular driving portion does not interfere with the operating key within the rotation range of the rotating body.

In the in-vehicle knob switch according to the above-mentioned embodiment, the cutout portion into which the operating key is loosely inserted is provided in a portion of the circumferential wall of the tubular driving portion that is opposite to the spiral hole for a slider. The cutout portion is disposed such that the inner wall of the cutout portion does not interfere with the operating key within the rotation range of the rotating body. Therefore, it is possible to arrange the operating key close to the operating ring portion without any difficulty. In this case, when the user continuously operates the operating ring portion and the operating key, it is possible to reduce the movement of user's fingers, and thus improve operability. In addition, in the inner space of the tubular driving portion, the push switch operated by the operating key can be mounted on one surface of the circuit board, and the slide operating type electronic part can be mounted on the other surface of the circuit board. Therefore, even when the size of the circuit board is reduced, it is possible to easily ensure a mounting space for various electric parts, and thus provide an in-vehicle knob switch having a small size.

In the above-mentioned embodiment, the cutout portion may be formed as a notch in the circumferential wall of the tubular driving portion. However, it is preferable that the cutout portion be formed as a window in the circumferential wall of the tubular driving portion, in order to improve the mechanical strength of the tubular driving portion.

Further, in the above-mentioned embodiment, the slider of the slide operating type electric part may include a sliding element, and a conductor pattern that comes into slide contact with the sliding element may be provided on the circuit board. In this case, it is possible to manufacture rotation detecting electric parts having high reliability at a low cost. Further, in the above-described embodiment, the rotating body and the operating ring portion may be individually formed and they may be snap-fitted to each other. In this case, the rotating body can be formed of a material capable of improving the mechanical strength of the tubular driving portion having the cutout portion provided therein, and the operating ring portion can be formed of a material capable of improving the design of the operating ring portion forming the outward appearance of the knob switch, which is varied preferably to improve the functionality of the knob switch. Furthermore, when the length of the cutout portion in the circumferential direction thereof is set such that the inner walls that are opposite to each other in the circumferential direction come into contact with the operating key to serve as a stopper for the rotating body, within the rotation range of the rotating body, it is not necessary to additionally provide a stopper. Therefore, it is possible to simplify the structure of the stopper and thus provide an in-vehicle knob switch having a small size. Further, in this structure, when the cutout portion is formed as a window in the circumferential wall of the tubular driving portion, the cutout portion, serving as the stopper, can improve the mechanical strength of the rotating body. Therefore, even when the user operates the operating ring portion with strong force, the rotating body is less likely to be damaged. As a result, it is possible to provide an in-vehicle knob switch having high reliability.

As described above, according to one embodiment of the in-vehicle knob switch of the present disclosure, the spiral hole engaged with the slider of the slide operating type electronic part and the cutout portion into which the operating key is loosely inserted are provided in the circumferential wall of the tubular driving portion that is integrally rotated with the operating ring portion at positions that are substantially opposite to each other, and the cutout portion is disposed such that it does not interfere with the operating key within the rotation range of the rotating body. Therefore, it is possible to arrange the operating key close to the operating ring portion without any difficulty. In this case, when the user continuously operates the operating ring portion and the operating key, it is possible to reduce the movement of user's fingers, and thus improve operability. In addition, it is possible to mount the push switch and the slide operating type electronic part in overlapping regions on both surfaces of the circuit board. As a result, even when the size of the circuit board is reduced, it is possible to easily ensure a mounting space for various electric parts, and thus easily reduce the size of a housing.

DETAILED DESCRIPTION

Figure 1:
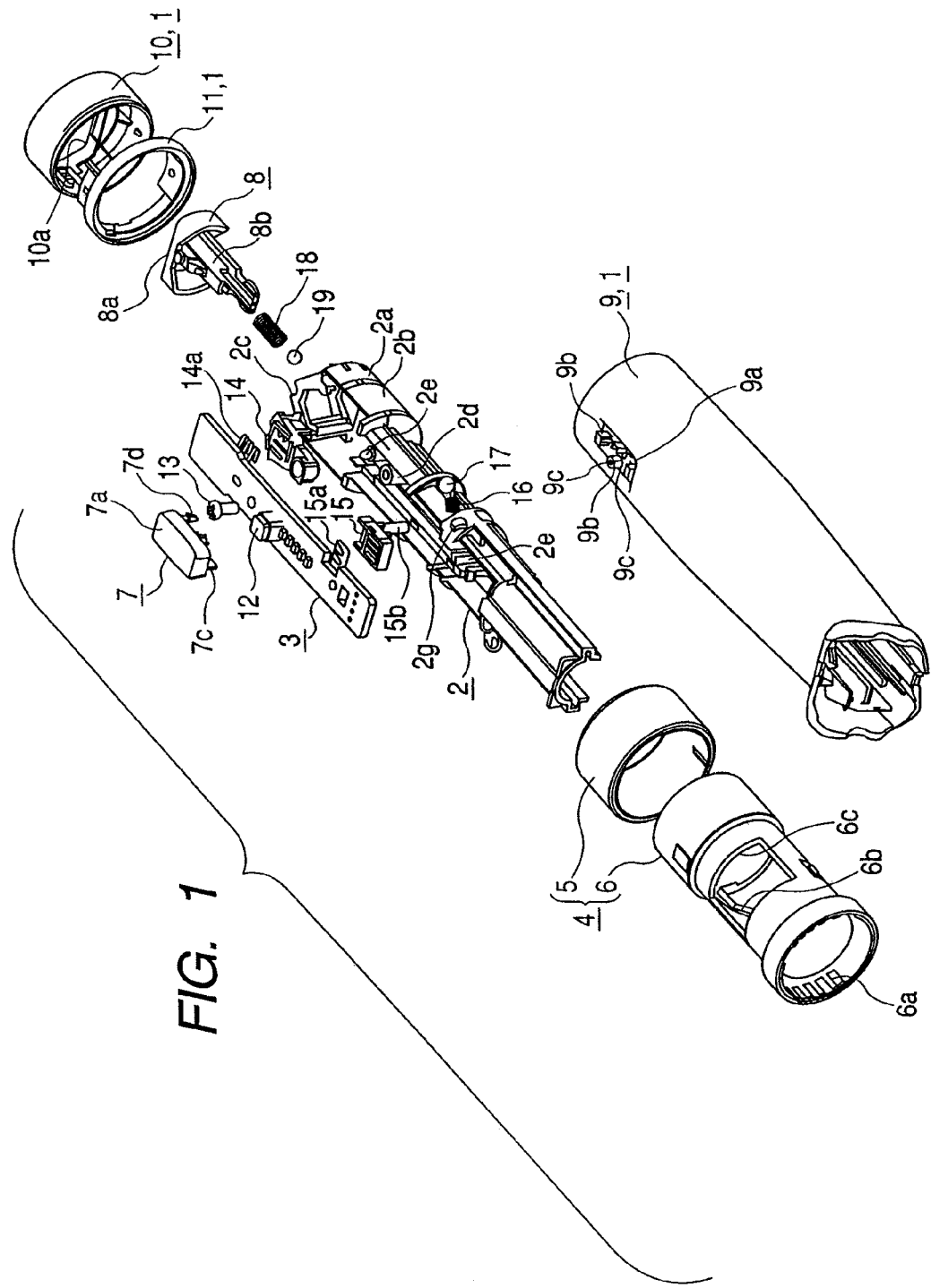
FIG. 1 is an exploded perspective view illustrating an in-vehicle knob switch according to an embodiment of the present disclosure invention.
Figure 2:
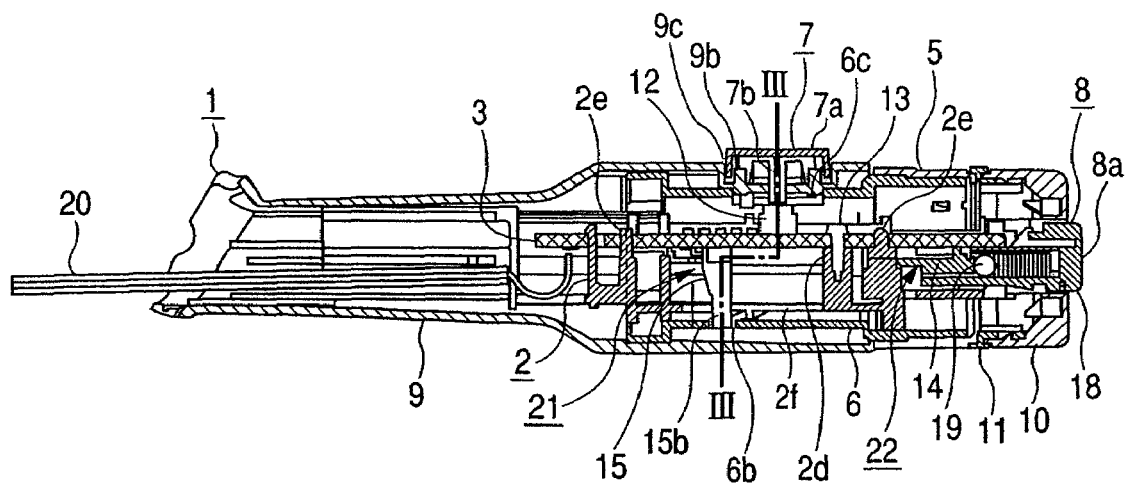
FIG. 2 is a cross-sectional view illustrating the in-vehicle knob switch.
Figure 3:
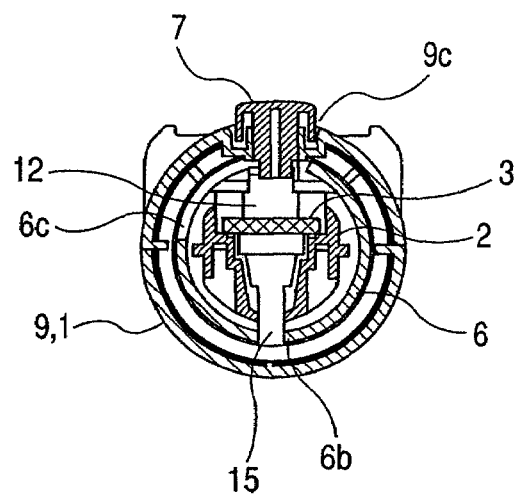
FIG. 3 is a cross-sectional view illustrating the in-vehicle knob switch taken along the line III-III of FIG. 2.
Figure 4:
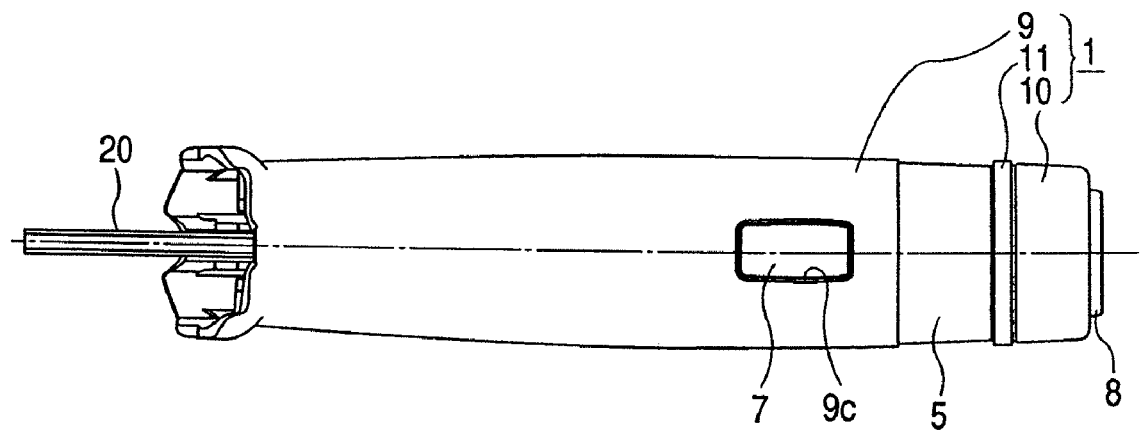
FIG. 4 is a plan view illustrating the in-vehicle knob switch.

Hereinafter, exemplary embodiments of the present disclosure will be described with reference to the accompanying drawings. FIG. 1 is an exploded perspective view illustrating an in-vehicle knob switch according to an embodiment of the present disclosure. FIG. 2 is a cross-sectional view illustrating the in-vehicle knob switch. FIG. 3 is a cross-sectional view illustrating the in-vehicle knob switch taken along the line III-III of FIG. 2. FIG. 4 is a plan view illustrating the in-vehicle knob switch.

The in-vehicle knob switch shown in the drawings includes: a tubular housing 1 that forms a portion of a combination switch; a holder 2 that is disposed inside the housing 1; a circuit board 3 that is fixed to the holder 2; various electric parts, such as a push switch 12 and a slide switch 21, mounted on the circuit board 3; a rotating body 4 that is formed by integrating an operating ring portion 5 with a tubular driving portion 6; an operating key 7 for a push operation; and an operating knob 8 for a tilting operation.

The housing 1 is formed of a synthetic resin, and includes a main case 9 having a long tubular shape, a cap 10 that is attached to the holder 2 at a position spaced from a leading end of the main case 9, and a ring 11 that is fitted to the end of an opening portion of the cap 10 facing the main case 9. The inner wall of the main case 9 is formed in a shape that can position the holder 2 inserted thereinto, and the rotating body 4 is rotatably fitted to the holder 2. In addition, the cap 10 is fitted to a large diameter portion 2a of the holder 2 that protrudes from the leading end of the main case 9, and the operating ring portion 5 of the rotating body 4 is exposed between the main case 9 and the ring 11. An opening 9a is formed in an outer circumferential surface of the main case 9 in the vicinity of the leading end thereof, and a plurality of guide walls 9b each having a concave portion 9c provided therein are vertically provided in the inner circumference of the opening 9a. In addition, an opening 10a is provided in the leading end of the cap 10, and the operating knob 8 is disposed so as to pass through the opening 10a.

The operating key 7 is used to press the push switch 12. The operating key 7 is formed of a synthetic resin, and is provided in the concave portion 9c of the housing such that it can move up and down, with its operating surface 7a being exposed. A driving rod 7b is vertically provided at the center of the rear surface of the operating key 7, and a plurality of leg pieces 7c are vertically provided around the driving rod 7b. The driving rod 7b passes through the opening 9a of the housing 1 and is mounted on the push switch 12. The plurality of leg pieces 7c are slidably engaged with the guide walls 9b. In this way, the leg pieces 7c are guided by the guide walls 9b, which makes it possible to move up and down the operating key 7 without a rattle. In addition, a retaining piece 7d is provided on the rear surface of the operating key 7, and the retaining piece 7d is fitted to a concave portion (not shown) of the housing 1 to prevent the detachment of the operating key 7. In this embodiment, the operating key 7 passes through the opening 9a of the housing 1 and is mounted on the push switch 12. The operating key 7 may be provided such that the operating surface 7a is substantially flush with the outer circumferential surface of the housing 1. Further, in this embodiment, the leg pieces 7c of the operating key 7 are guided by the concave portions 9c of the guide walls 9b that are vertically provided on the inner circumference of the opening 9a of the housing 1, but the present disclosure is not limited thereto. For example, a guide may be provided on the circuit board 3 separately from the housing 1 so as to abut on the opening 9a of the housing 1, and concave portions for guiding the leg pieces 7c may be provided in the guide.

The holder 2 is an elongated member that is formed of a synthetic resin and extends along the inner space of the main case 9. A large diameter portion 2a provided at one end of the holder 2 protrudes from the main case 9 and is then snap-fitted to the cap 10. The large diameter portion 2a includes a cylindrical surface 2b that guides the rotation of the rotating body 4 and a support portion 2c, which is a tilting point of the operating knob 8. A screw locking protrusion 2d to which the screw 13 is tightened to fix the circuit board 3 and a plurality of positioning protrusions 2e that position the circuit board 3 protrude upward from the inner bottom of the holder 2. The positioning protrusion 2e closest to the support portion 2c also serves as a support shaft that rotatably supports a sliding-element supporting member 14 of a seesaw switch 22. In addition, a linear slit 2f that guides a slider 15 of the slide switch 21 such that it can reciprocate is provided in the bottom of the holder 2, and a concave portion 2g that holds a metal ball 17 with a spring 16 interposed therebetween is provided in the side of the holder 2.

The operating knob 8 is a member that is formed of a synthetic resin and tilts the sliding-element supporting member 14. The operating knob 8 is tiltably supported by the support portion 2c of the holder 2, and an operating surface 8a of the operating knob 8 is exposed through the opening 10a of the cap 10. A metal ball 19 is held in a tubular portion 8b of the operating knob 8 with a spring 18 interposed therebetween, and the metal ball 19 comes into elastic contact with the sliding-element supporting member 14 of the seesaw switch 22. The sliding-element supporting member 14 is also formed of a synthetic resin, and is supported by the holder 2 so as to be rotatable along the lower surface of the circuit board 3. A sliding element 14a is attached to the sliding-element supporting member 14, and the sliding element 14a comes into elastic contact with the lower surface of the circuit board 3. When the operating knob 8 is tilted using the support portion 2c as a supporting point, the tubular portion 8b is reversely inclined, and sliding-element supporting member 14 is tilted in the opposite direction. At that time, the metal ball 19 slides on a cam surface of the sliding-element supporting member 14, thereby generating a click peeling.

The slide switch 21 is a slide operating type electric part, and includes the slider 15 that can reciprocate in the longitudinal direction of the circuit board 3. The slider 15 is formed of a synthetic resin, and a drooping piece 15b of the slider 15 is slidably inserted into the slit 2f of the holder 2. The slider 15 is guided by the slit 2f such that it can reciprocate on the lower surface of the circuit board 3 in a straight line. The sliding element 15a is attached to the slider 15, and the sliding element 15a comes into elastic contact with the lower surface of the circuit board 3.

The circuit board 3 is fixed to the holder 2 by the screw 13. For example, the push switch 12 is mounted on the upper surface of the circuit board 3, and the driving rod 7b of the operating key 7 is mounted on a stem of the push switch 12. In addition, for example, the seesaw switch 22 or the slide switch 21 is mounted on the lower surface of the circuit board 3. That is, although not shown in the drawings, a fixed contact for a seesaw switch that comes into slide contact with the sliding element 14a attached to the sliding-element supporting member 14, or a fixed contact for a slide switch that comes into slide contact with the sliding element 15a attached to the slider 15 is patterned on the lower surface of the circuit board 3. The contacts are switched according to the tilting operation of the sliding-element supporting member 14 or the reciprocation of the slider 15. As shown in FIG. 2, a region in which the push switch 12 is mounted and a region in which the slide switch including the slider 15 is mounted substantially overlap each other on both surfaces of the circuit board 3. In addition, a cable 20 shown in FIG. 2 or FIG. 4 is used to electrically connect the circuit board 3 to an external circuit.

The rotating body 4 is formed by snap-fitting the operating ring portion 5 that is formed of a synthetic resin to one end of the tubular driving portion 6 that is formed of a synthetic resin in a substantially cylindrical shape. The rotating body 4 is fitted to the holder 2 and the circuit board 3 and is rotatably coupled to the housing 1. The rotation of the rotating body 4 is guided by, for example, the cylindrical surface 2b of the holder 2. The operating ring portion 5 fitted to one end of the tubular driving portion 6 is exposed between the main case 9 and the ring 11 of the housing 1, and is rotated. The operating ring portion 5 is close to the operating key 7 exposed from the outer circumferential surface of the main case 9. Click grooves 6a are provided at regular intervals in the inner wall of the other end of the tubular driving portion 6 in the circumferential direction thereof, and the metal ball 17 held in the concave portion 2g of the holder 2 comes into elastic contact with the click groove 6a such that it can be engaged with or disengaged from the click groove 6a. The tubular driving portion 6 is inserted into the housing 1 (the main case 9), and a spiral hole 6b and a cutout portion 6c are provided in the circumferential wall of the tubular driving portion 6 so as to be substantially opposite to each other. A leading end of the drooping piece 15b of the slider 15 is inserted into the spiral hole 6b, and the inner wall of the spiral hole 6b drives the drooping piece 15b with the rotation of the rotating body 4 (the tubular driving portion 6). In this way, the slider 15 moves in a straight direction while being guided by the slit 2f. The cutout portion 6c is a window that is substantially opposite to the spiral hole 6b, and the driving rod 7b of the operating key 7 is loosely inserted into the cutout portion 6c. In addition, the cutout portion 6c is formed such that interference between the cutout portion 6c and the operating key 7 can be prevented in the rotation range of the rotating body 4. That is, the cutout portion 6c is formed such that the inner walls that are opposite to each other in the circumferential direction serve as a stopper for the rotating body 4 that rotates, or the cutout portion 6c is formed with a sufficient length in the circumferential direction such that the inner wall of the cutout portion 6c does not come into contact with the operating key 7 within the rotation range of the rotating body 4.

In the in-vehicle knob switch according to the above-mentioned embodiment, when a user rotates the operating ring portion 5, the tubular driving portion 6 is integrally rotated with the operating ring portion 5, and the rotary power is converted into the rectilinear motion of the slider 15 of the slide switch 21 by an engaging portion between the spiral hole 6b and the drooping piece 15b. As a result, the contact position between the sliding element 15a attached to the slider 15 and the fixed contact for a slide switch that is formed on the lower surface of the circuit board 3 is changed, and an electric signal corresponding to the rotation of the operating ring portion 5 is output from the circuit board 3 to an external circuit through the cable 20. In addition, when the tubular driving portion 6 is rotated, the metal ball 17 is engaged with and disengaged from the click groove 6a, and a click peeling is transmitted to user's fingers. Further, as described above, even when the operating ring portion 5 is rotated, the tubular driving portion 6 does not come into contact with the operating key 7.

When the user pushes the operating surface 7a of the operating key 7, the stem of the push switch 12 is pushed down by the driving rod 7b of the operating key 7. Then, on/off signals of the push switch 12 are output from the circuit board 3 to an external circuit through the cable 20.

When the user operates the operating knob 8 to tilt the sliding-element supporting member 14 of the seesaw switch 22, the contact position between the sliding element 14a attached to the sliding-element supporting member 14 and the fixed contact for a seesaw switch that is formed on the lower surface of the circuit board 3 is changed, and a predetermined electric signal is output from the circuit board 3 to an external circuit through the cable 20.

As described above, in the in-vehicle knob switch according to this embodiment, the cutout portion 6c into which the operating key 7 is loosely inserted is provided in the circumferential wall of the tubular driving portion 6 at a position that is substantially opposite to the spiral hole 6b for the slider 15, and the cutout portion 6c is formed such that the inner wall of the cutout portion 6c does not interfere with the operating key 7 within the rotation range of the rotating body 4. Therefore, it is possible to arrange the operating key 7 close to the operating ring portion 5 without any difficulty. In this case, when the user continuously operates the operating ring portion 5 and the operating key 7, it is possible to reduce the movement of user's fingers, and thus improve operability. In addition, in the inner space of the tubular driving portion 6, the push switch 12 operated by the operating key 7 can be mounted on one surface of the circuit board 3, and the slide switch 21 including the slider 15 can be mounted on the other surface of the circuit board 3. Therefore, it is not necessary to arrange the mounting regions of the switches so as to deviate from each other in the longitudinal direction of the circuit board 3. As a result, even when the size of the circuit board 3 is reduced, it is possible to easily ensure a mounting space for various electric parts, and thus easily reduce the size of the housing 1.

Further, the cutout portion 6c into which the operating key 7 is loosely inserted may be formed as a notch in the circumferential wall of the tubular driving portion 6. However, as in this embodiment, it is preferable that the cutout portion 6c be formed as a window in the circumferential wall of the tubular driving portion 6, in order to improve the mechanical strength of the tubular driving portion 6.

Furthermore, in the in-vehicle knob switch according to this embodiment, the operating ring portion 5 for a rotating operation, the operating key 7 for a push operation, and the operating knob 8 for a tilting operation are provided in the housing 1, but the present disclosure is not limited thereto. The present disclosure can be applied to an in-vehicle knob switch having at least the operating ring portion 5 and the operating key 7 provided in the housing 1, and the operating knob 8 may be omitted, if necessary, or a key top for a push operation may be provided instead of the operating knob 8. In addition, the operating ring portion 5 may be integrally formed with the tubular driving portion 6, and the slider 15 operated by the tubular driving portion 6 may be a component of a slide volume.

Moreover, in this embodiment, as the slide switch 21, which is a slide type electric part, the fixed contact for a slide switch is patterned on the lower surface of the circuit board 3 having the push switch 12 mounted thereon, and the sliding element 15a that comes into slide contact with the fixed contact for a slide switch is attached to the slider 15, but the present disclosure is not limited thereto. A slide switch, serving as a single unit, may be mounted on the lower surface of the circuit board 3. In addition, other slide operating type electronic parts, such as a slide volume, may be used instead of the slide switch.

In the above-described embodiment, the rotating body 4 and the operating ring portion 5 are individually provided, and they are snap-fitted to each other. Therefore, the rotating body 4 can be formed of a material capable of improving the mechanical strength of the tubular driving portion 6 having the cutout portion 6c provided therein, and the operating ring portion 5 can be formed of a material capable of improving the design of the operating ring portion 5 forming the outward appearance of the knob switch, which is varied preferably to improve the functionality of the knob switch. Alternatively, the rotating body 4 may be integrally formed with the operating ring portion 5.

Furthermore, in the above-described embodiment, when the length of the cutout portion 6c in the circumferential direction thereof is set such that the inner walls that are opposite to each other in the circumferential direction come into contact with the operating key 7 to serve as a stopper for the rotating body 4, within the rotation range of the rotating body, it is not necessary to additionally provide a stopper. Therefore, it is possible to simplify the structure of the stopper and thus provide an in-vehicle knob switch having a small size. Further, in this structure, when the cutout portion 6c is formed as a window in the circumferential wall of the tubular driving portion 6, the cutout portion 6c, serving as the stopper, can improve the mechanical strength of the rotating body 4. Therefore, even when the user operates the operating ring portion 5 with strong force, the rotating body 4 is less likely to be damaged. As a result, it is possible to provide an in-vehicle knob switch having high reliability.

The invention claimed is:

1. An in-vehicle knob switch comprising:
 a tubular housing that has an opening disposed in a portion of an outer circumferential surface thereof;
 a holder that is disposed inside the housing;
 a circuit board that is fixed to the holder;
 a push switch that is mounted on one surface of the circuit board that faces the holder;
 a slide operating type electric part that is mounted on the other surface of the circuit board;
 an operating key that pushes the push switch; and a rotating body that has a tubular driving portion that can operate the slide operating type electric part, wherein the operating key is exposed to the outside of the housing through the opening, the rotating body includes an operating ring portion that is rotatable and exposed from the outer circumferential surface of the housing, a spiral hole engaged with a slider of the slide operating type electric part is disposed in a portion of a circumferential wall of the tubular driving portion, a cutout portion into which the operating key is loosely inserted is provided in another portion of the circumferential wall that is substantially opposite to the spiral hole, and the cutout portion is disposed such that the tubular driving portion substantially does not interfere with the operating key within the rotation range of the rotating body.

2. The in-vehicle knob switch according to claim 1, wherein the cutout portion is disposed as a window in the circumferential wall of the tubular driving portion.

3. The in-vehicle knob switch according to claim 2, wherein the slider includes a sliding element, and a conductor pattern that comes into slide contact with the sliding element is provided on the circuit board.

4. The in-vehicle knob switch according to claim 1, wherein the slider includes a sliding element, and a conductor pattern that comes into slide contact with the sliding element is provided on the circuit board.

5. The in-vehicle knob switch according to claim 1, wherein the rotating body is snap-fitted to the operating ring portion, the rotating body is coupled to the housing while being rotatably fitted to the holder, and the operating ring portion is fitted to one end of the tubular driving portion.

6. The in-vehicle knob switch according to claim 5, wherein the holder has a cylindrical surface that guides the rotation of the rotating body.

7. The in-vehicle knob switch according to claim 1, wherein the length of the cutout portion in a circumferential direction thereof is set such that inner walls thereof that are opposite to each other in the circumferential direction do not come into contact with the operating key within the rotation range of the rotating body.

8. The in-vehicle knob switch according to claim 1, wherein the length of the cutout portion in a circumferential direction thereof is set such that inner walls thereof that are opposite to each other in the circumferential direction come into contact with the operating key to serve as a stopper for the rotating body, within the rotation range of the rotating body.

9. The in-vehicle knob switch according to claim 8, wherein the cutout portion is disposed as a window in the circumferential wall of the tubular driving portion.

* * * * *